(12) United States Patent
DeMassa

(10) Patent No.: US 9,481,775 B2
(45) Date of Patent: Nov. 1, 2016

(54) POLYURETHANE SCORCH INHIBITOR

(71) Applicant: VANDERBILT CHEMICALS, LLC, Norwalk, CT (US)

(72) Inventor: John M. DeMassa, Trumbull, CT (US)

(73) Assignee: VANDERBILT CHEMICALS, LLC, Norwalk, CT (US)

( * ) Notice: Subject to any disclaimer, the term of this patent is extended or adjusted under 35 U.S.C. 154(b) by 0 days.

(21) Appl. No.: 14/692,038

(22) Filed: Apr. 21, 2015

(65) Prior Publication Data

US 2015/0307676 A1    Oct. 29, 2015

Related U.S. Application Data

(60) Provisional application No. 61/985,127, filed on Apr. 28, 2014.

(51) Int. Cl.

| | |
|---|---|
| *C08J 9/00* | (2006.01) |
| *C08G 65/26* | (2006.01) |
| *C08G 65/331* | (2006.01) |
| *C08L 71/02* | (2006.01) |
| *C08G 101/00* | (2006.01) |

(52) U.S. Cl.
CPC .......... *C08J 9/0023* (2013.01); *C08G 65/2612* (2013.01); *C08G 65/2615* (2013.01); *C08G 65/331* (2013.01); *C08L 71/02* (2013.01); *C08G 2101/00* (2013.01); *C08J 2375/08* (2013.01)

(58) Field of Classification Search
CPC .............. C08J 9/0023; C08J 2375/08; C08G 2101/00; C08G 65/2612; C08G 65/2615; C08G 65/331; C08L 71/02
See application file for complete search history.

(56) References Cited

U.S. PATENT DOCUMENTS

| | | |
|---|---|---|
| 2,758,119 A | 8/1956 | Bell |
| 4,209,648 A | 6/1980 | Cottman |
| 5,219,892 A | 6/1993 | Suhoza |
| 5,356,966 A | 10/1994 | Nesvadba |
| 7,247,658 B2 | 7/2007 | Ragsdale et al. |
| 7,390,912 B2 | 6/2008 | Xia |
| 7,601,853 B2 | 10/2009 | Xia |
| 2002/0032247 A1* | 3/2002 | Ragsdale ........... C08G 18/1825 521/155 |
| 2006/0135792 A1 | 6/2006 | Xia |
| 2011/0046250 A1* | 2/2011 | Stowell ................ C08K 5/0066 521/85 |
| 2011/0230579 A1 | 9/2011 | DeMassa |

OTHER PUBLICATIONS

International Search Report and Written Opinion of the International Searching Authority for corresponding application PCT/US2015/026808 dated Sep. 14, 2015.
John DeMassa, "Polyol Stabilization and the Introduction of a New PUR Slabstock Foam Antioxidant"; ResearchGate, p. 1-24, Sep. 2011.

\* cited by examiner

*Primary Examiner* — John Cooney
(74) *Attorney, Agent, or Firm* — Norris McLaughlin & Marcus, P.A.

(57) ABSTRACT

An additive composition for inhibiting scorch in a polyurethane foam composition, the additive comprising a derivatized hydroquinone; a derivatized lactone; and a derivatized phenolic compound. A polyurethane foam composition contains the additive composition.

8 Claims, No Drawings

POLYURETHANE SCORCH INHIBITOR

BACKGROUND OF THE INVENTION

The invention relates to an additive to polyurethane foam which inhibits scorch. Polyurethane slab-stock foam production involves a vigorous exothermic reaction. The prolonged post-reaction heat exposure leads to chemical changes that appear as darkening in the core of the production foam block and is defined as scorch. To suppress unwanted scorch, manufactures add antioxidant blends which have been generally referred to as scorch inhibitors. Scorch inhibitors act through complex sacrificial reactions that reduce the damaging effects of thermally induced darkening. Scorch inhibitors are thus effective at minimizing product loss.

Overview of Polyurethane Scorching

During the manufacture of polyurethane slabstock foam, a vigorous exothermic reaction is observed resulting in interior discoloration.[1] It is generally understood to be the result of the polyol and di-isocyante condensation (gel) reaction and the "blow reaction".[2]

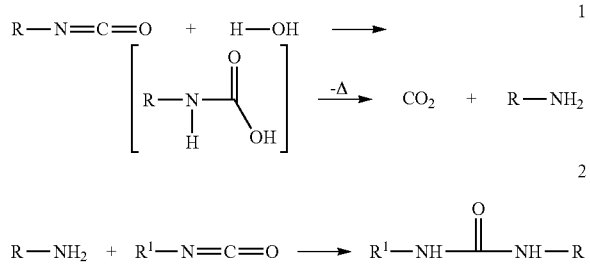

EQ.1. (Top) Hydrolysis of an isocyanate.
EQ.2. (Bottom) Amine condensation with isocyanate to yield a urea Workers have measured heats of reaction corresponding to the component moieties formed in the polyurethane foam matrix: approximately 24 kcal/mol for urethane and 47 kcal/mol for urea, respectively. Visually, a darkened yellow discoloration known as scorch in the core of the production foam block develops resulting from un-dissipated heat. Investigators have shown that complex free radical reactions drive the scorching process.[3] Degradation effects have been indirectly measured showing chain scission and oxidation of polyether polyol formula components.[4] Formulas such as the present invention have been used to reduce chain scission and general chemical alteration of the PUR foam.

Environmental Factors and Foam Discoloration

Nitrogen Oxide Induced Discoloration of PUR Foam

Polyurethane foam manufactures are concerned about another PUR foam degradation phenomenon.[5] Typically heat, light, photo-oxidation, and $NO_x$ fumes (principally Nitric Oxide (NO) and Nitrogen Dioxide ($NO_2$)) produce yellow or pink hues on the foam surface (Equation 3).[6]

Equation 3: Combustion of Propane.

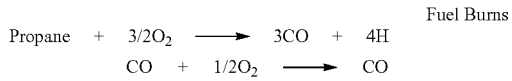

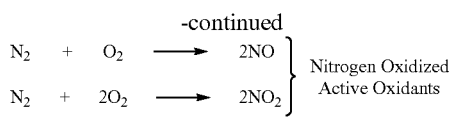

With regard to nitrogen oxide fumes, discoloration has been strongly associated with elevated $NO_x$ levels in warehouses. Seasonal effects have been discussed in the literature. In the cooler months, poorly vented warehouses tend to accumulate greater concentrations of $NO_x$ fumes arising from propane-powered fork lifts, and gas-fired furnaces.[7] The effect is well understood. Tompkins and Smith explain that multiple fugitive emissions such as carbon monoxide, secondary smoke from smokers, chemical off-gasses from new products, and exhaust fumes collect in warehouses.[8] In the warmer months, discoloration is driven by elevated levels of $NO_x$ in the atmosphere from factory operations and automobile emissions.[9] The warmer months feature an additional factor that influences NOx fume concentration and its chemistry. According to a number of atmospheric studies, $NO_x$ continues to react with oxygen and water vapor to become air born nitric acid aerosol.[10] Apparently nitric acid is found in the hydrate form in high humidity conditions. One study showed that the amount of nitric acid particles on glass fiber greatly increased in high humidity conditions versus low humidity conditions.[11] Thus, the warehouse atmosphere, which is enriched in $NO_x$ fumes, can form acidic aerosols. The chemistry of $NO_x$ fumes is complex but its impact on foam ingredients and color is widely accepted.[12,13] The present invention reduces the discoloration effects commonly observed in warehouse stored PUR foam compared against other known antioxidant scorch inhibitors.

Fluorescent Light and UV Induced Discoloration of PUR Foam

A number of relevant studies have been done that suggest how PUR likely contributes to color arising from photo-oxidative effects.[14] Chandra reports that short wavelength (<340 nm) irradiation promotes a photo-Fries mechanism where the urethane linkage is ruptured and reattaches to the aromatic ring, leaving a free-$NH_2$. At longer wavelengths, colored species are derived from hydroperoxide reactions. The observed yellowing, according to Noack and Schwetlick, is the result of oxidation of the exposed amino functionality on the aromatic ring (Equation 4).

Equation 4: Proposed Photo-oxidation of amine-free TDI segment in PUR.

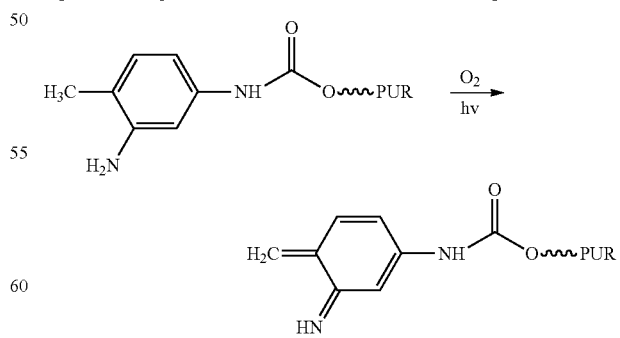

MDI-based polyurethanes similarly undergo a two-step pathway to quinone species through hydrogen atom abstraction followed by peroxide formation.[15] Other components in the foam composition can potentially contribute to color.

For example, BHT and alkylated diphenylamine have been reported to form staining quinone compounds upon exposure to nitrogen oxides (FIG. 19).[1] The present invention delays the transformation shown in FIG. 3 or itself contributes less to photo-oxidative induced color bodies compared with other antioxidant scorch inhibitor.

FOG and VOC Emission from Polyurethane Foam

Concerns over the quality of indoor (home, vehicle, workplace) air continue to grow worldwide and consequently legislative demands have targeted potentially harmful volatile substances. The polyurethane foam sector including all additive suppliers has moved in the direction of strategies that reduce or eliminate non-compliant products. For automotive interiors a particular test has been developed to measure the total volatile content in plastic, rubber and polyurethane materials. The present accepted method set by the German Automotive Association is VDA 278, which employ a thermodesorption GC analysis to determine the volatile organic content (VOC) and fogging potential of automotive trim materials.[16] The method measures volatile organic compounds ranging up to n-C20 (desorbed from sample at 90° C. for 30 minutes) and the semi-volatile and heavy compounds from n-C16 to n-C32 (FOG value) (desorbed from sample at 120° C. for 60 minutes). The reported values are then compared with product specifications passing or failing accordingly. Gravimetric methods have also been employed for which one will be used as a screening tool to characterize the volatility of organic liquids presented here.[17]

SUMMARY OF THE INVENTION

The present invention relates to additive liquid blend compositions for use in the manufacture of polyurethane foams, the additive comprising A: derivatized hydroquinones;
B: derivatized lactones; and
C: derivatized phenolic compounds Derivatized hydroquinones (A) components are selected from among the following compounds:
 di-tert-butyl-hydroquinone (DTBHQ), t-Butylhydroquinone (TBHQ), 2-Methyl-5-isopropylhydroquinone, and the preferred compound 2,5-di-tert-amyl-hydroquinone (DTAHQ);
 alkylated hydroquinone monoglycidyl ethers described in U.S. Pat. No. 2,758,119, incorporated herein by reference;
 monooctylated hydroquinone as set forth in U.S. Pat. No. 4,209,648, incorporated herein by reference;
 hydroquinone products prepared by reacting a combination comprising hydroquinone and an olefin selected from the group consisting of nonenes and 2,4,4-trimethyl-1-pentene at a temperature from 65° C. to a temperature less than the boiling point of the olefin in the presence of a Friedel-Crafts catalyst, the molar ratio of the olefin to the hydroquinone being from 1:1 to 10:1 where the olefin is nonene and 1.5:1 to 3:1 where the olefin is 2,4,4-trimethyl-1-pentene, as described in U.S. Pat. No. 4,209,648, incorporated herein by reference; and
 combinations of any of the above.

Derivatized lactone compounds (B) components are selected from the lactone stabilizers or blends thereof disclosed in U.S. Pat. Nos. 7,390,912 and 7,601,853, and U.S. Patent Application Publication No. 20060135792, all incorporated by reference herein, and is preferably a commercially available product known as Milliguard® AOX-1.

These lactone stabilizers are generally described as polymeric or oligomeric lactone antioxidants, such as poly (oxyalkylene) chain(s) substituted 3-arylbenzofuranones or poly(caprolactone) chain(s) substituted 3-arylbenzofuranones.

A particularly preferred lactone, which is described as a polymeric lactone compound, is disclosed in U.S. Pat. No. 7,390,912.

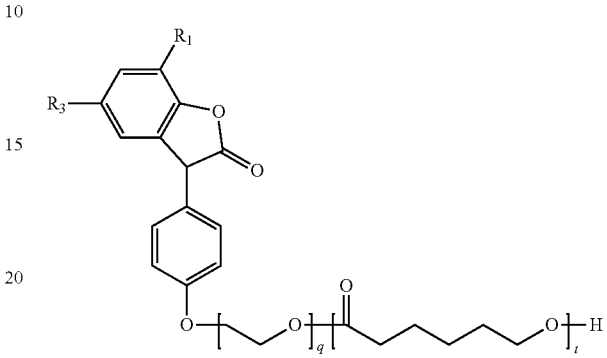

where $R_1$ and $R_3$ are independently selected from the group consisting of: H, F, Cl, Br, I, $C_1$-$C_{20}$ alkyls, $C_1$-$C_{20}$ cycloalkyls, $C_1$-$C_{20}$ alkoxy groups, $C_7$-$C_{20}$ phenalkyls and phenyl groups; q is a positive integer between 1 and 20, and t is a positive integer between 0 and 20, and wherein q+t is equal to or greater than 3.

Derivatized phenolic compounds (C) generally comprise a (2,6-di-tert-butyl)phenol substituted at the 4 position with an aliphatic, aromatic or aliphatic-aromatic moiety, optionally possessing combinations of hetero atoms O, N, S, and P; and mixtures thereof. Particular examples representative of this class include but are not limited to: 2,6-Di-tert-butyl-4-nonylphenol, 2,4-Dioctylthiomethyl-6-methylphenol, 4,6-Bis(octylthiomethyl)-o-cresol, Isotridecyl-3-(3,5-di-tert-butyl-4-hydroxyphenyl) propionate, Iso-octyl-3-(3,5-di-tert-butyl-4-hydroxyphenyl) propionate. Many other phenolics having a solid or liquid form may be mixed with or used alone in the composition are possible and include 2,6-di-tert-butyl-4-methylphenol, 2-tert-butyl-4,6-dimethylphenol, 2,6-di-tert-butyl-4-ethyl-phenol, 2,6-di-tert-butyl-4-n-butyl-phenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol, 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol, 2,6-di-tert-butyl-4-methoxyphenol, 2,5-di-tert-butylhydroquinone, 2,5-di-tert-amylhydro-quinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate, α-tocopherol, β-tocopherol, γ-tocopherol, δ-tocopherol, 2,2'-methylenebis(6-tert-butyl-4-methylphenol), 2,2'-methylene-bis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4- methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonyl-phenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methyl-phenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis(3,5-dimethyl-2-hydroxyphenyl)butane, 2,2-bis(3,5-di-tert-butyl-4-hydroxyphenyl)propane, 2,2-bis(5-tert-butyl-4-hydroxy2-methylphenyl)-4-n-dodecylmercaptobutane, 1,1,5,5-tetra-(5-tert-butyl-4-hydroxy-2-methylphenyl)pentane, esters of β-(3,5-di-tert-butyl-4-hydroxyphenyl)-propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, esters of β-(5-tert-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propio-nyloxy}-1,1-dimethylethyl]-2,4,8,10-tetraoxaspiro[5.5]undecane, esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, esters of 3,5-di-tert-butyl-4-hydroxy-phenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, amides of β-(3,5-di-tert-butyl-4-hydroxyphenyl)propionic acid e.g. N,N'-bis(3,5-di-tert-butyl-4-hydroxyphenylpropionyl)hexamethylenediamine, N,N'-bis(3,5-di-tert-butyl-4-hydroxyphenylpropionyl)trimethylenediamine, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1, supplied by Uniroyal) and mixtures thereof. Preferred compounds are Iso-octyl-3-(3,5-di-tert-butyl-4-hydroxyphenyl) propionate and mixture of C-13 to C-15 alcohol ester-3-(3,5-di-tert-butyl-4-hydroxyphenyl) propionate.

Preferred ranges of the scorch inhibitor formulation include, by weight percent of the formulation:

About 1-25% Group A hydroquinone, preferably about 5-15%;

About 5-25% Group B lactone such as Milliguard® AOX-1; preferably about 5-15%;

About 70-90% Group C phenolic; preferably about 75-85%.

Preferred ranges of the formulation within a polyurethane foam are about 0.001 to 5 pbw; more preferably about 0.2-3.5 pbw; and most preferably about 0.2-0.5 pbw An exemplary scorch inhibitor formulation, Example 1, comprises 2,5-di-tert-amyl-hydroquinone (Group A) at about 10%; the commercially available polymeric or oligomeric lactone product known as Milliguard® AOX-1, which is presumed to be a blend of lactones (Group B) at about 10%; and Iso-octyl-3-(3,5-di-tert-butyl-4-hydroxyphenyl) propionate (Group C) at about 80%. All percentages set out herein are in weight percent.

A typical foam recipe is shown (TABLE 1, foam A). In some of the examples to follow a non-flame retardant formula will also be employed to demonstrate the effectiveness of the new blend against prior art (TABLE 1, foam B).

TABLE 1

PUR box foam recipe

| Component | A. (Pbw) | B. (Pbw) |
|---|---|---|
| polyether polyol[1] | 100.00 | 100 |
| Water | 6.00 | 7.25 |
| triethylene diamine (catalyst) | 0.31 | 0.31 |
| FR silicone surfactant | 1.21 | 1.21 |
| tris (1,3-dichloroisopropyl phosphate) (fire retardant) | 7.00 | 0.00 |
| dibutyltin dilaurate (tin catalyst) | 0.25 | 0.25 |
| toluene diisocyanate (106 TDI index) | 70.45 (106 TDI index) | 76.43 (115 TDI index) |
| scorch inhibitor | Up to 0.50 | Up to 0.50 |

[1]3000 Mw, Reported Hydroxyl Number = 54.1 mg/g KOH
2. Ingredients Parts by Weight (pbw)

The testing protocol is described below.

Foams were prepared with differing antioxidant packages to assess the performance of the novel blend against comparative "benchmarks".

Scorch performance was assessed by exposing cake box sized foams to microwave heating. The box foams were subjected to microwave heating for 8 minutes or as the daily conditions required—sometimes longer or shorter according to humidity. (Microwave Oven: General Electric Household Microwave Oven; Mod. Num. JE1860 GB 001; KW: 1.55; VAC/HZ: 120/60. 8 min; @30% power in the microwave). The foams produced after a short curing cycle in an oven (2 min) were allowed to cool to room temperature before examination of the interior scorched area. Swatches of foam were cut from each specimen and discoloration was assessed. The extent of darkening in the scorched region of microwaved foams was quantitatively evaluated. Delta E values were collected using a Technidyne Corp. Brightimeter Micro S4M.

EXAMPLES

This inventive blend was tested in the polyurethane foam formulation (TABLE 1).

Testing included comparison with three commercially available products which benchmark the performance of the novelty blend (TABLE 2).

Example C3 corresponds to component B of the inventive scorch inhibitor and is a commercially available blend featured in U.S. Pat. No. 7,390,912 B2 described by the supplier as polymeric or oligomeric lactone antioxidants, known as Milliguard® AOX-1, as is available from Milliken Chemical.

Example C4 is a VANOX® liquid scorch inhibitor available from Vanderbilt Chemicals, LLC, and described in U.S. Pat. No. 5,219,892, containing alkylated diphenyl amine and an alkylated phenolic compound, in particular (a) tetrakis [methylene(3,5-di-tert-butyl-4-hydroxyhydrocinnamate)] methane and (b) a reaction product of diphenylamine and diisobutylene wherein the molar ratio of the amine to the diisobutylene is 1:1.1 to 1:2.5. The stabilizer composition may contain a third synergistic component, phenothiazine or certain alkyl derivatives of phenothiazine.

Example C5 a product available through Ciba Specialty Chemicals, known at Irgastab® PUR 68, which is believed to follow the teaching of U.S. Pat. No. 5,356,966, and presumably comprises a derivatized lactone and other antioxidants but the exact composition is not known.

Example C6 consists of the derivatized phenol isotridecyl-3-(3,5-di-tert-butyl-4-hydroxyphenyl) propionate (80%) and Milliguard® AOX-1 lactone (Example C3) (20%). The comparative blend follows a ratio approximating the components taught in U.S. Pat. No. 7,247,658 (Example 4).

Example C7 consists of the derivatized phenol iso-octyl-3-(3,5-di-tert-butyl-4-hydroxyphenyl) propionate (9%); a reaction product of diphenylamine and diisobutylene wherein the molar ratio of the amine to the diisobutylene is 1:1.1 to 1:2.5 (14%); commercially available polymeric or oligomeric lactone product known as Milliguard® AOX-1 (34%); and Songsorb® 3260

2-(2'-hydroxy-3'-t-butyl-5'-methylphenyl)-5-chloro benzotriazole (43%) (manufactured by Songwon and available from Vanderbilt Chemicals, LLC). The comparative blend follows a ratio of components as taught in U.S. Pat. No. 7,601,853 B2 (Additive Package BB).

Example 8

Example 8 comprises 2,5-di-tert-amyl-hydroquinone (10%) and the commercially available polymeric or oligomeric lactone product known as Milliguard® AOX-1 (10%), and mixture of C-13 to C-15 alcohol ester-3-(3,5-di-tert-butyl-4-hydroxyphenyl) propionate (ANOX® 13-15 (Addivant USA, LLC), CAS: 171090-93-0).

As set forth in Tables 2 and 2A below, the inventive blend Example 1, at equal loading levels (0.2 pbw) in the foam composition, gave far less discoloration as shown by the reduced dE measurements.

TABLE 2A

Scorch Performance of Antioxidant Packages (dE Colorimetric measurements) at 0.2 pbw in polyurethane foam composition

|  | Example C6 | Example 1 |
| --- | --- | --- |
| Iso-octyl-3-(3,5-di-tert-butyl-4-hydroxyphenyl) propionate (PH-1) | 80 | 80 |
| Example C3* Blend from U.S. Pat. No. 7,390,912 B2 Milliguard ® AOX-1 | 20 | 10 |
| 2,5-di-tert-amyl-hydroquinone (HQ-1) | — | 10 |
| dE (Scorch) | 22.8 | 11.10 |

TABLE 2

Scorch Performance of Antioxidant Packages (dE Colorimetric measurements) at 0.2 pbw in polyurethane foam composition

| Example C3* | Example C4: | Example C5: | Example 1 |
| --- | --- | --- | --- |
| 4.85 | 10.87 | 8.75 | 2.75 |

Another round of testing comparing the inventive blend against two lactone compositions drawn from the nearest prior art (U.S. Pat. No. 7,390,912 B2) shows that the inventive blend (Example 1) reduces scorch more dramatically (TABLE 3). We note here that Example C7 is a combination of a phenolic, alkylated diphenyl amine, polymeric lactone and benzotriazole which does not form a liquid blend upon mixing, unlike Example 1 which does form a liquid—a highly desirable feature in commercial application.

TABLE 3

Scorch Performance of Antioxidant Packages (dE Colorimetric measurements) at 0.2 pbw in polyurethane foam composition

| Example 1 | Example C3* | Example C7 |
| --- | --- | --- |
| 2.89 | 3.61 | 15.54 |

Another series demonstrates that the inventive formula continues to reduce scorch in the absence of flame retardant. Notably the total weight of the inventive blend is below the incumbent formula yet showing lower scorch. (TABLE 4)

TABLE 4

Scorch Performance of Antioxidant Packages (dE Colorimetric measurements) in polyurethane foam composition B (Table 1B).

| Example C4: Alkylated Diphenyl Amine blend with alkylated phenolic (0.27 pbw) + Isotridecyl-3-(3,5-di-tert-butyl-4-hydroxyphenyl) propionate (0.15 pbw) (total 0.41 pbw) | Example 1 0.22 (pbw) | Example 1 0.25 (pbw) |
| --- | --- | --- |
| 15.19 | 10.18 | 7.78 |

Gas Fade Studies
Environmental Factors and Foam Discoloration

Foam manufacturers, aware of the effects of nitrogen oxide fumes, today commonly publish information bulletins alerting customers to discoloration issues while positioning new products to mitigate the effect.[18] To simulate exposure of PUR foam to NOx fumes, a test known as Gas Fade was developed using at first simple laboratory apparatus to capture generated combusted fumes to which subject materials are exposed.[19] For this, manufacturers began offering fume chambers that amounted to Bunsen burners positioned in enclosures with a sample carousel. The specimens are exposed to the captured combusted gas fumes for a prescribed length of time.[20] In our own evaluations, specimens are placed within the chamber and periodically examined using colorimetric measurements.

are proprietary phosphorus ester blend and non-halogen phosphorus ester, respectively, available from ICL Industrial Products. The data is shown over the length of the run, which is of some interest. The inventive formula was found to impart less color development over the trial period (2 hours) independent of the flame retardant type.

TABLE 6

| Hours | C4 0.2 pbw HF4 | C4 0.2 pbw HF5 | Example 1 0.2 pbw HF4 | Example 1 0.2 pbw HF5 | C4 0.5 pbw HF4 | C4 0.5 pbw HF5 | Example 1 0.5 pbw HF4 | Example 1 0.5 pbw HF5 |
|---|---|---|---|---|---|---|---|---|
| 1 | 2.19 | 1.15 | 1.14 | 0.59 | 1.87 | 0.99 | 0.76 | 0.45 |
| 1.5 | 3.55 | 3.15 | 2.98 | 2.21 | 4 | 3.55 | 3.2 | 1.82 |
| 2 | 5.26 | 4.31 | 4.44 | 3.1 | 5.74 | 3.6 | 4.54 | 2.85 |

Gas Fade Study: 2 hours
United States Testing Co., Inc, Atmospheric Fume Chamber, Model No. 8727, Serial Number 13411, 230 Volt, 50 Cycle, 1 Phase App. NO concentration 3.3 min.-5.8 max. (NO2 not detected)

Light Fade Evaluation Comparing Example 1 Against C4 (Phenolic/ADPA Blend) and

Finally, foam swatches were exposed to common florescent light and monitored over 6 days. The inventive blend was compared against the ADPA/phenolic blend (C4) and throughout the trial period showed lower discoloration in two chosen concentrations (TABLE 7).

TABLE 7

| Days | C4 0.2 pbw HF4 | C4 0.2 pbw HF5 | Ex. 1 0.2 pbw HF4 | Ex. 1 0.2 pbw HF5 | C4 0.5 pbw HF4 | C4 0.5 pbw HF5 | Ex. 1 0.5 pbw HF4 | Ex. 1 0.5 pbw HF5 |
|---|---|---|---|---|---|---|---|---|
| 1 | 5.42 | 2.53 | 3.45 | 1.92 | 6.54 | 4.55 | 3.21 | 2.32 |
| 4 | 13.08 | 10.62 | 11.6 | 8.42 | 14.43 | 11.07 | 11.25 | 8.09 |
| 6 | 15.41 | 13.21 | 14.24 | 11.1 | 16.54 | 13.53 | 14.29 | 10.36 |

Light Fade Study: 2 hours

In this study, two concentration levels were examined comparing the inventive blend against the prior art formulation (C7). At the higher concentration (3.5 pbw) the inventive blend developed significantly less discoloration (dE=4.81) than the prior art formulation (dE=7.05), while at the lower concentration (0.5 pbw), a noticeable advantage over the prior art is also demonstrated. Notably, the selected level (3.5 pbw) was cited in the patent from which C7 was derived, and thus serve as a useful comparison for Example 1. (TABLE 5)

TABLE 5

| Composition | Example 1 (0.5 pbw) | Example C7 (0.5 pbw) | Example 1 (3.5 pbw) | Example C7 (3.5 pbw) |
|---|---|---|---|---|
| dE | 7.44 | 9.39 | 4.81 | 7.05 |

Gas Fade Study: 2 hours
United States Testing Co., Inc, Atmospheric Fume Chamber, Model No. 8727, Serial Number 13411, 230 Volt, 50 Cycle, 1 Phase App. NO concentration 3.3 min-5.8 max. (NO2 not detected)

Gas Fade Evaluation Comparing Example 1 Against C4 (Phenolic/ADPA Blend) and Light Fade Studies Example 1 (the inventive blend) was compared with a common phenolic/ADPA blend at two levels commonly used in industrial formulations. Additionally the formula was modified with the flame retardant used in the PUR foam, per Table 1, foam A. Fyrol® HF-5 and HF-4 flame retardants Components Vs. Blend Evaluation In order to demonstrate that the inventive blend shows a true synergy over its individual components, the scorch performance was determined for each component from Example 1. A gas fade study was also conducted on the foams produced. (Table 8) Two tools were used to assess the blend performance including a simple mean and weighted mean, the latter based upon concentration of the particular component in the blend. The individual components showed varied levels of performance, from darkest to lightest interiors, as follows: derivatized phenolic PH-1 (23.24)>derivatized lactone AOX-1 (8.88)>hydroquinone HQ-1 (4.14). Assuming each contributes equally to the final scorch performance in the blend, the predicted dE value is $\bar{x}=12.53$. Assuming each contributes according to its weighted presence in the blend composition, the predicted value is $\bar{x}_w=26.64$. In fact, the blend is below both the simple mean and weighted mean, thus showing a true synergy (dE=5.47). The fume chamber results showed a similar trend but perhaps more surprisingly the discoloration was not only least in comparing with the expected means but below all measured values (TABLE 8), again demonstrating a true synergy in the blend.

TABLE 8

Scorch performance and fume chamber testing of Example 1 and components.

| Compound | Example C3* Blend from U.S. Pat. No. 7,390,912 B2 Milliguard ® AOX-1 | Iso-octyl-3-(3,5-di-tert-butyl-4-hydroxyphenyl)propionate (PH-1) | 2,5-di-tert-amyl-hydroquinone (HQ-1) | $\bar{x}$ | $\bar{x}_w$ | Example 1 |
|---|---|---|---|---|---|---|
| Scorch Performance (dE) | 8.88 | 23.24 | 4.14 | 12.53 | 19.87 | 5.47 |
| Fume Chamber 6 hours (NO$_x$) (dE) | 23.39 | 27.98 | 19.21 | 23.53 | 26.64 | 18.27 |

Formula Adjustments

The relative concentration of the components in the blend was modified and assessed. (TABLE 9) In this series of experiments it was found that increasing either the lactone, the hydroquinone or both, generally leads to improvement in scorch performance (A-C) compared with Example 1. Increase of the phenolic and decrease of both lactone and hydroquinone leads to reduction of scorch performance (D) compared with Example 1. However, increasing the concentration of hydroquinone resulted in liquid instability where a precipitate formed within days after the blend was prepared. One requirement of a successful commercial product is that it remains liquid as long as possible, which suggests some of the modified blends are less favorable.

TABLE 9

Formula adjustments. Scorch Performance and Fume Chamber exposure

| | A | B | C | D | Example 1 |
|---|---|---|---|---|---|
| Iso-octyl-3-(3,5-di-tert-butyl-4-hydroxyphenyl) propionate (PH-1) | 70 | 70 | 60 | 90 | 80 |
| Example C3* Blend from U.S. Pat. No. 7,390,912 B2 Milliguard ® AOX-1 | 20 | 10 | 20 | 5 | 10 |
| 2,5-di-tert-amyl-hydroquinone (HQ-1) | 10 | 20 | 20 | 5 | 10 |
| dE (Scorch) | 8.93 | 7.12 | 6.75 | 15.46 | 9.36 |
| dE (NOx, 6 hours) | 17.09 | 17.12 | 16.54 | 17.20 | 17.12 |
| Physical form after 5 days | liquid | Very Heavy ppt | Heavy ppt | liquid | liquid |

Volatility Considerations

As discussed, it is desirable to reduce the volatility of components found in polyurethane foam. Gossner et al, explain, "It is known from the prior art that polyurethane foams can emit volatile organic constituents (VOC), this emission in general being undesirable. These emissions are (detectable) . . . "[21] The present invention can be adjusted to use higher molecular weight alkylated phenolic compounds which potentially reduce the volatility of the compound. To demonstrate this, Example 8 was prepared, identical to Example 1, except that a higher molecular weight phenolic was substituted, namely, mixture of C-13 to C-15 alcohol ester-3-(3,5-di-tert-butyl-4-hydroxyphenyl) propionate (ANOX® 13-15. Firstly, the modified blend Example 8 was observed to perform similarly to Example 1. (TABLE 10).

TABLE 10

Alternative alkylated phenolic compounds
dE Values are the average of 3 runs

| Example 1 | Example 8 |
|---|---|
| 8.94 | 7.21 |

As preferred by the user of the scorch inhibitor package, the formula can be adjusted to reduce emission or VOC. The adjusted composition Example 8 showed less volatility over time compared with Example 1. Thermal gravimetric analysis (ASTM E2008) measuring the weight loss of a charge over time showed a significant difference in the two blends. (TABLE 11). Expectedly the higher molecular weight component helps reduce weight loss throughout the run (c.f. Example 1 vs. Example 8).

TABLE 11

Alternative alkylated phenolic compounds effect on weight loss

| Sample | Initial Weight (mg) | Final Weight (mg) | Total Weight Loss, (%) |
|---|---|---|---|
| Example 1A | 8.8800 | 0.928 | 90% |
| Example 1B | 10.3030 | 1.184 | 89% |
| Example 8A | 5.8270 | 3.681 | 37% |
| Example 8B | 9.4790 | 6.651 | 30% |

Method: Thermals Gravimetric Analysis: Ramp 5.0° C./min to 160° C., Isothermal for 240 min ASTM E2008 Standard Test Methods for Volatility Rate by Thermogravimetry In reviewing the test results, the following is noted.

Example 1 blend when compared with its single components reduces scorch to a greater extent than its components on an equal weight basis demonstrating a true synergy. The lactone antioxidant identified in U.S. Pat. No. 7,390,912 B2 (Example C3) reduces scorch more poorly compared with the inventive composition using this lactone blend (Example 1). The other antioxidant components of the inventive blend also reduce scorch more poorly than the blend (Example 1). As also discussed Moreover, the tested charge level of lactone used in the evaluation of C3 (0.5 pbw) was much greater than the lactone level in the blend of Example 1 (0.05 pbw). Other blends disclosed in the family of lactone' patents concerning the prior art C3, such as C6 and C7 were also found to develop more scorch than the inventive blend.

Example C5 is a commercially available lactone composition—though its exact formulation is undisclosed by the manufacturer. Here too the inventive formulation (Example 1) developed less scorch at equal loading levels.

Example 1 is also free of alkylated diphenyl amine (found in Example C4) and its parent starting material diphenyl amine. DPA is undesirable in numerous products and in Europe.[23] As such Example 1 while providing improved scorch reduction offers reduced health concerns. Accordingly, the invention also comprises a polyurethane foam incorporating the additive formulation, which is free or substantially free of diphenyl amine. The inventive formula also contributes to less color development during exposure to NOx fumes and common fluorescent light compared with alkylated diphenyl amine blends such as C4.

While Example 1 demonstrates that the inventive blend reduces scorch better than several prior art or commercial compositions, it can be modified to reduce volatility potentially of concern in various market sectors.

[1] M. P. Luda et. al, Discoloration in fire retardant flexible polyurethane foams. Part I. Characterization, Polymer Degradation and Stabilization, 83 (2004), p.215.

[2] Brian Kaushiva, Structure-Property Relationships Of Flexible Polyurethane Foams, Ph.D. Thesis, Virginia Polytechnic Institute and State University, 1999, p. 5. (http://scholar.lib.vt.edu/theses/available/etd-083199-185156/unrestricted/KAUSHIVA1.PDF, accessed 7-6-11.

[3] Y. Su, Wang Wan Jiang, Thermal Stability of Poly(oxypropylene-ether) Polyol, Thermochimica Acta, 123 (1988) 221-231.

[4] J. DeMassa, Polyol Stabilization and the Introduction of a New PUR Slabstock Foam Antioxidant, Conference: Polyurethanes 2011 Technical Conference

[5] J. DeMassa, PTZ: A Troublesome Ingredient; Promising Solutions, Polyurethane Foam Association, Spring Meeting 2012

[6] Klempner, p.74.

[7] John R. Richards, Control of Nitrogen Oxides Emissions, Student Manual, APTI Course 419, p3-4 (2000). "The leading contributors of anthropogenic NOX emissions are vehicles and electric generating units (EGUs)."

[8] James A. Tompkins, Jerry D. Smith, The Warehouse Management Handbook, Tompkins Press, 2nd Ed., p.399, 1998.

[9] Foamex web publication, http://www.fxi.com/assets/pdf/Discoloration_Info.pdf, accessed Apr. 11, 2012.

[10] Kobara et al., Aerosol and Air Quality Research, Vol. 7, No. 2, p. 194, 2007

[11] Jia L, Xu Y. Characterization of condensed phase nitric acid particles formed in the gas phase, J Environ Sci (China); 23(3), p.412, 2011.

[12] Flexible polyurethane foam inhibited from discoloring, Bridgestone Corporation, United States Patent Application 20060247325 (2006).

[13] Additives for Polyurethanes, http://www.mufong.com.tw/Ciba/ciba_guid/additives_polyurethane.pdf, p.18, accessed Apr. 18, 2012.

[14] B. P. Thapliyal and R. Chandra, Prog. Polym. Sci. Vol. 15, 735-750, 1990, p.738.

[15] J. Gardette, et al. Makromol. Chem. 182 (1981) p.2723.

[16] Reduced VOC and Fog Emissions In Flame Retardant Automotive Foams, Polyurethane Foam Association, 2005 Fall Meeting Oct. 6, 2005, Francis Marion Hotel, Charleston, S.C.

[17] ASTM E2008 *Standard Test Methods for Volatility Rate by Thermogravimetry*

[18] Foamex technical literature, http://fxi.com/assets/pdf/Discoloration_Info.pdf, accessed Jan. 29, 2015,

[19] http://www.freepatentsonline.com/3988292.pdf

[20] Equipment: United States Testing Co., Inc, Atmospheric Fume Chamber, Model No. 8727, Serial Number 13411, 230 Volt, 50 Cycle, 1 Phase.

[21] Matthäus Gossner, Peter Haas, Sven Meyer-Ahrens, Bert Klesczewski, Process for production of flexible polyurethane foams with low emission US 20100305228 A1

[22] PFA Spring Meeting May 16-17, 2012, Baltimore Md., *PTZ: Troublesome Ingredient; Promising Solutions.*

[23] http://grist.org/news/chemical-banned-in-europe-is-probably-on-your-apple/, accesses Apr. 25, 2012.

What is claimed is:

1. An additive composition for inhibiting scorch in a polyurethane foam composition, the additive comprising:
a derivatized hydroquinone at greater than 5% to about 15% by weight;
a derivatized lactone at about 10-20% by weight; and
a derivatized phenolic compound at about 70-80% by weight,
wherein the additive composition is substantially free of diphenyl amine.

2. The additive composition of claim 1, wherein the derivatized hydroquinone is present at about 10% by weight.

3. The additive composition of claim 1, wherein the derivatized hydroquinone is 2,5-di-tert-amyl-hydroquinone;
the derivatized lactone is

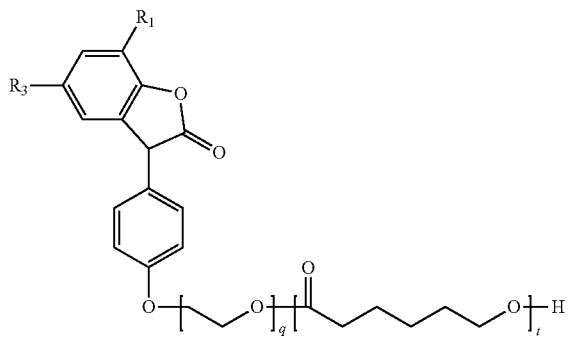

where $R_1$ and $R_3$ are independently selected from the group consisting of: H, F, Cl, Br, I, $C_1$-$C_{20}$ alkyls, $C_1$-$C_{20}$ cycloalkyls, $C_1$-$C_{20}$ alkoxy groups, $C_7$-$C_{20}$ phenalkyls and phenyl groups; q is a positive integer between 1 and 20, and t is a positive integer between 0 and 20, and wherein q+t is equal to or greater than 3; and the derivatized phenolic compound is (a) isotridecyl-3-(3,5-di-tert-butyl-4-hydroxyphenyl) proprionate or (b) mixture of C-13 to C-15 alcohol ester-3-(3,5-di-tert-butyl-4-hydroxyphenyl) propionate.

4. A polyurethane foam composition, comprising a scorch inhibitor additive composition at about 0.001-5 pbw, the additive composition comprising, by weight of the total additive:
- a derivatized hydroquinone at greater than 5 to about 15%;
- a derivatized lactone at about 10-20%; and
- a derivatized phenolic compound at about 70-80%;
  - wherein the foam composition is substantially free of diphenyl amine.

5. The polyurethane foam composition of claim 4, wherein the additive composition is present at about 0.2-3.5 pbw.

6. The polyurethane foam composition of claim 4, wherein the additive composition is present at about 0.2-0.5 pbw.

7. The polyurethane foam composition of claim 5, wherein the additive composition comprises:
the derivatized hydroquinone at about 10% by weight.

8. The polyurethane foam composition of claim 4, wherein
the derivatized hydroquinone is 2,5-di-tert-amyl-hydroquinone;

the derivatized lactone is

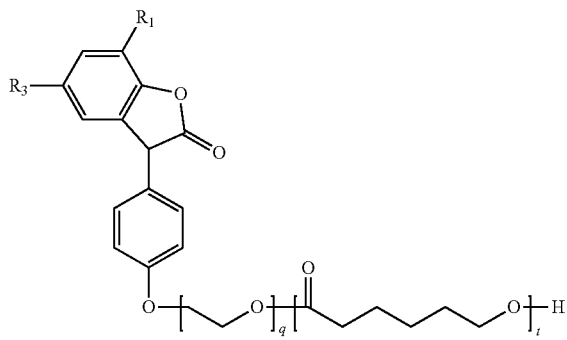

where $R_1$ and $R_3$ are independently selected from the group consisting of: H, F, Cl, Br, I, $C_1$-$C_{20}$ alkyls, $C_1$-$C_{20}$ cycloalkyls, $C_1$-$C_{20}$ alkoxy groups, $C_7$-$C_{20}$ phenalkyls and phenyl groups; q is a positive integer between 1 and 20, and t is a positive integer between 0 and 20, and wherein q+t is equal to or greater than 3; and the derivatized phenolic compound is (a) isotridecyl-3-(3,5-di-tert-butyl-4-hydroxyphenyl) proprionate or (b) mixture of C-13 to C-15 alcohol ester-3-(3,5-di-tert-butyl-4-hydroxyphenyl) propionate.

* * * * *